(No Model.) 3 Sheets—Sheet 1.

C. E. BUELL.
ELECTRIC LIGHTING OF RAILWAY CARS.

No. 365,460. Patented June 28, 1887.

WITNESSES:
Fred G. Dieterich
M. S. Smith

INVENTOR
Charles E. Buell (No Model.) 3 Sheets—Sheet 2.

C. E. BUELL.
ELECTRIC LIGHTING OF RAILWAY CARS.

No. 365,460. Patented June 28, 1887.

WITNESSES:
Fred G. Dieterich
M. S. Smith

INVENTOR
Charles E. Buell

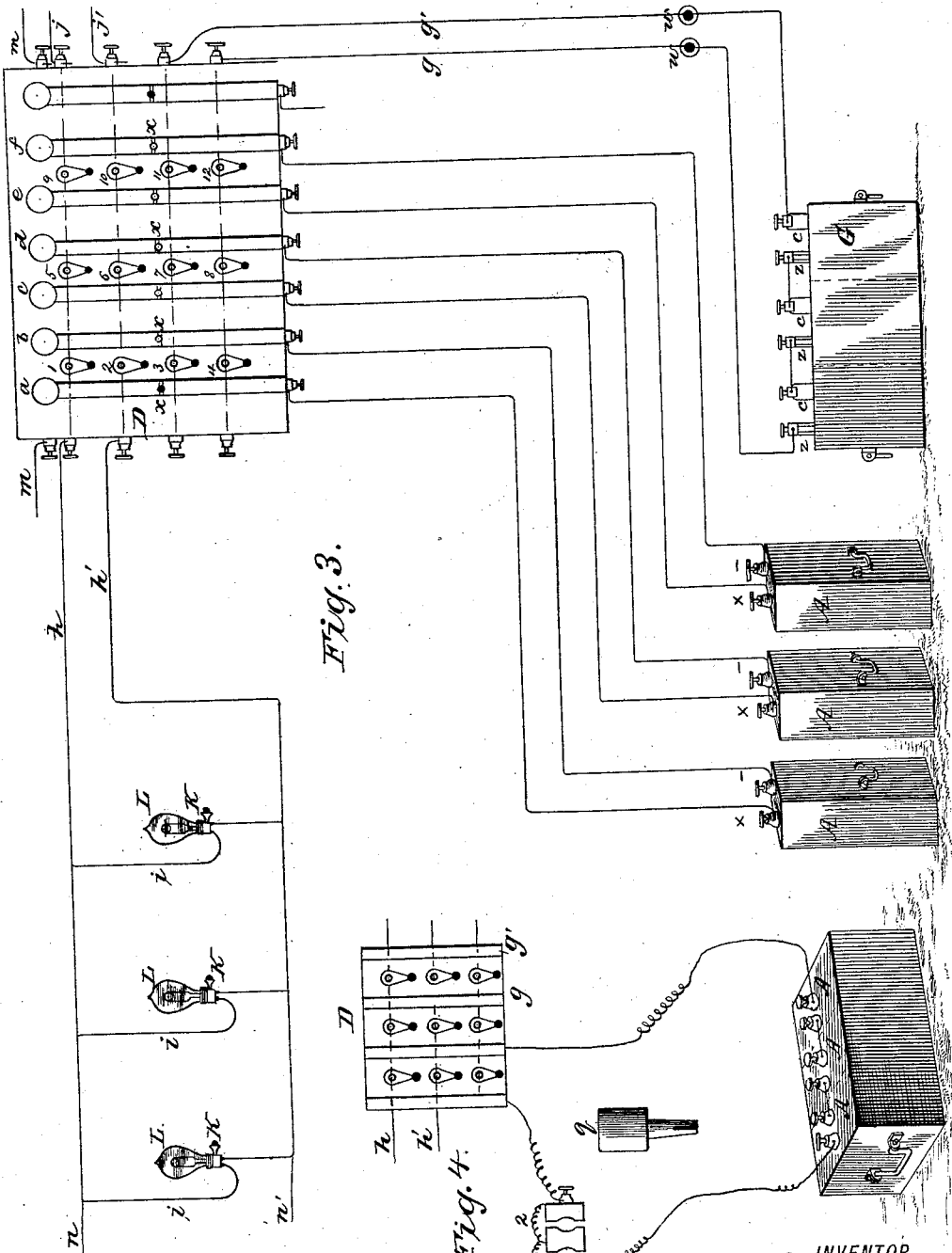

UNITED STATES PATENT OFFICE.

CHARLES E. BUELL, OF SPRINGFIELD, MASSACHUSETTS.

ELECTRIC LIGHTING OF RAILWAY-CARS.

SPECIFICATION forming part of Letters Patent No. 365,460, dated June 28, 1887.

Application filed February 19, 1886. Renewed May 26, 1887. Serial No. 239,488. (No model.)

*To all whom it may concern:*

Be it known that I, CHARLES E. BUELL, of Springfield, Hampden county, State of Massachusetts, have invented Improvements in Electric Lighting of Railway-Cars, of which the following is a specification.

My invention consists, primarily, in the combination, with a railway-car, and with electric lamps properly supported from the roof or sides thereof, of a battery placed beneath the floor of said car and switch mechanism above the floor of said car for connecting between said lamps and said battery or batteries, substantially as hereinafter described.

My invention further consists in sub-combinations, to be hereinafter described.

Figure 1:
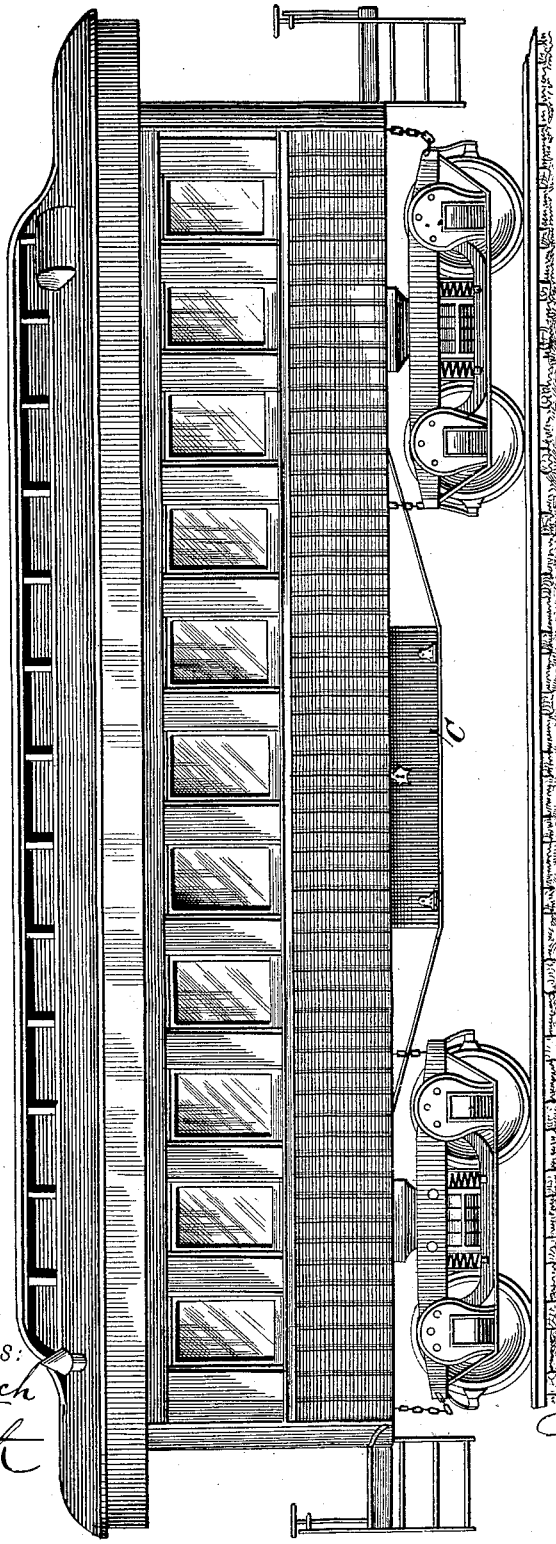
Figure 2:
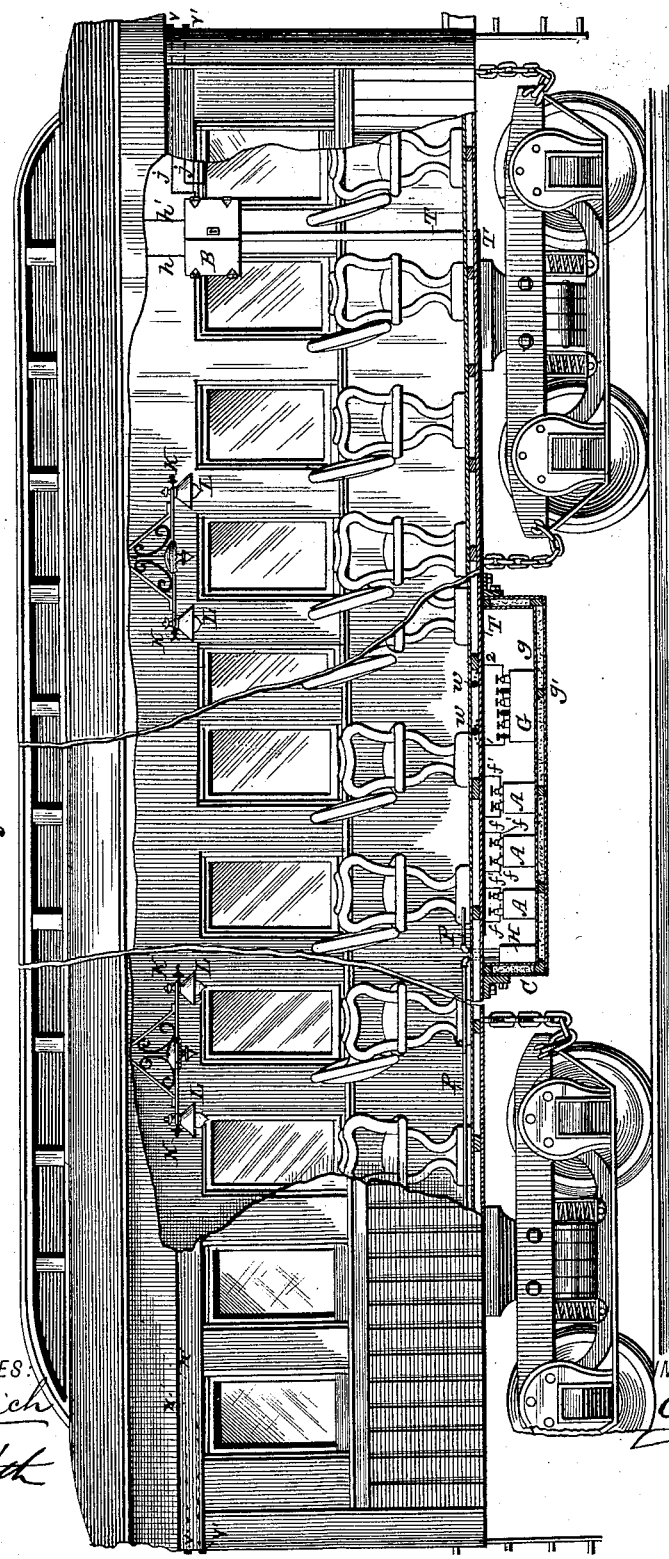

Figure 1 shows the exterior of a car arranged according to my invention. Fig. 2 shows a car in longitudinal cross-section arranged to carry out my invention. Figs. 3 and 4 show details of my invention.

In Fig. 1 the compartment C, for containing a battery or batteries, is shown beneath the floor of the car and between the trucks thereof, said compartment consisting of a box-like structure built tight enough to exclude dust from entering to within the same, and provided with a door at the side of the car that is hinged and when opened drops down or swings down and admits of introducing the required battery or batteries into said compartment, and to inspect or remove the same therefrom.

As it requires a considerable amount of battery to generate a sufficient current of electricity to illuminate an ordinary passenger-car acceptably, the space necessary for the placing of the battery is not available in the car. I have placed the required battery beneath the car, where space can be afforded, and where the considerable weight of battery is placed low down, with obvious advantages in the motion of the car as compared with placing such a weight in or on the top of the car, with the additional advantages that the compartment can be supported by the truss-rods of the car and the batteries be readily introduced from a truck or hand-car, or loaded from the car to a truck, and can be easily refilled or inspected without entering the car—advantages resulting from the location of the batttery or batteries in a compartment beneath the floor of the car.

In Fig. 2 the compartment C is seen in cross-section as having double sides, between which is packed mineral wool, coal-ashes, sawdust, or other non-conductor of heat, so that when the door of the compartment is closed dust cannot enter, and an even temperature can be maintained within the compartment, two very desirable objects to be attained.

The battery-cells A A A and the trough-battery G are shown in the compartment, together with a heater, H, connected to the steam or hot-water pipes P P, used to warm the car. Any preferred form of heater or a simple coil or length of the pipe P P may be used, or heated air be admitted to the compartment C.

By the proper warming of the battery-compartment C in winter the liquids employed in the battery or batteries are not only prevented from congealing, but give better action, it being a well-known fact that chemical combinations take place more readily in a warm than in a cold atmosphere.

More than one compartment may be used upon a single car without departing from my invention.

I have shown a storage-battery and a battery that is replenished by the use of chemical fluids. Both the storage-battery and the battery replenished by chemical fluids are galvanic batteries.

Other forms of galvanic battery or generator may be used in place of those shown.

I contemplate introducing the storage-battery cells A A A into compartment C charged; but on long routes they might require to be recharged, which can be done satisfactorily by connecting the several cells A A A in multiple arc in the circuit of a large trough-battery, G, which in turn can be replenished at terminal stations. I also show connections w w in the side of the car over the compartment C, that connect with the wires leading from battery G to the box B, so that battery G may be disconnected from its circuit and a dynamo or other generator, located at a point remote from the car, be connected to recharge the cells A A A or to maintain the lamps in the car or cars, while cells A A A are disconnected, and especially when the car or train is not in motion. The box B is placed at a convenient height above the floor in the interior of the car, preferably in the saloon or porter's closet, and is provided with suitable means for fastening it, so that it will not be opened except by authorized persons.

As it would be desirable to turn on or cut out the lights or batteries when the car is in motion, the location of the appliances above the floor in the interior of the car results in accomplishing this object and without inconvenience.

In the box B is placed a switch mechanism, which is shown in Fig. 3, and is to be hereinafter described. The wires leading from compartment C to the box B and from the box B to the lamps and connections $v\ v'$ are heavily insulated and laid in a cleat-like or intermural conduit, T T, or they may be inclosed in a suitable pipe.

Fig. 3 shows the cells A A A connected to the strips $a, b, c, d, e$, and $f$ of a Culgan switch, D. The said strips are each in two pieces, but held normally connected into one by metallic plugs or pins $x\ x$. The wires $g\ g'$ and lamp-circuit wires $h\ h'$ pass back of the supporting-board, as shown by dash-lines, and to these wires are connected the swinging switch-plates 1, 2, 3, 4, 5, 6, 7, 8, 9, 10, 11, and 12.

In the wires $g\ g'$ is connected battery G, and attached to the said wires are connections to the outside of the car at $w\ w$, so that the wires $g\ g'$ may be disconnected and the battery G removed, and a dynamo or other generator be connected to the switch D through circuit-wires outside of and not portable with the car.

By the arrangement of the parts of the switch and batteries and circuits the battery A A A may be connected in tension series in the lamp-circuit; or a portion only of these cells may be thus connected, so that a portion of a large number of cells could be held in reserve and introduced when desired.

The lamps L L L are shown in multiple branch wires $i\ i\ i$, and each lamp or branch wire is provided with a switch, K, so that the flow of the current to each lamp can be controlled at the lamps or switch independent of the other lamps, and a part or all of the lamps in a car may be in operation, as desired. When the lamps are not in operation, the cells A A A, or either of them, can be disconnected from the wires $h\ h'$ in the switch D and be connected to the wires $g\ g'$, to be charged in multiple arc; or the wires $g\ g'$ and $h\ h'$ can be connected together, the cells A A A and battery G be disconnected, and the lamps L L L, or either of them, be lighted by a dynamo connected to wires $g\ g'$ at $w\ w$, as previously described. The wires $h\ h'$ extend to connections at $n\ n'$ and through binding-posts $j\ j'$, so that the lamp circuits of a train of cars may be connected into one continuous circuit and charged from a dynamo or generator located upon the locomotive or baggage-car, and the lamps in the several cars be lighted from a generator common to all the cars, or the cells A A A of the several cars be recharged from the said generator common to all the cars by connections that can be made in each car through the described Culgan switch D and its accessories. (Shown in Fig. 3.)

By opening the multiple branch wires $i\ i\ i$ by the switches K K K the connected wires $h\ h'$ of the several cars can be used as a charging-circuit without any of the lamps being in operation.

I have preferably shown the Culgan switch D, as it makes a wide separation between the swinging plates and the strips when in the position termed "open," requires no apprenticeship in its operation, and has no detachable parts that might be lost or mislaid, as might occur if a pin-switch were used; but any other form of switch may be used if the accessories or their equivalents are provided, as shown in Fig. 3.

The switch D (shown in Fig. 3 and described) is inclosed in a box, B, (shown in Fig. 2,) as stated.

The battery A A A and the battery G are fitted with water-tight lids to prevent the liquid contained therein from slopping out when the car is in motion and to prevent evaporation.

The cells A A A, battery G, connections $w\ w$ and $v\ v'$, the switch mechanism, and lamps are well known elements, requiring no detailed description of their construction and operation.

By the employment of the switch D or rotary or other switch, that admits of making like changes and connections, and by employing lamps in multiple branches with a switch for opening each branch independent of the others, and by being enabled to connect the complete system of one car to another car or cars, the said equipped car can be run in trains not provided with a generator outside of said car; or said car can be connected to a generator upon the locomotive, and the battery-cells A A A be connected into the circuit $h\ h'$, to be charged either in multiple arc or in tension series; or the circuits in said car can be charged from a dynamo at a station through connections at $w\ w$, as the exigencies of the case may make desirable.

The advantages of the switch D between the batteries A A A and G and the circuit $h\ h'$ are obvious. In addition to the manipulation of the batteries and circuits mentioned, the battery G can be connected into the lamp-circuit $h\ h'$ alone or with a portion or all the battery A A A, to co operate with the cells A A A, or either of them, to temporarily maintain illumination. The extra wire M M at the top of switch D may extend to the locomotive for working signals throughout the train.

The advantages of being able to reduce the light in a sleeping-car from its maximum to a desired point both by reducing the number of lamps in operation and by reducing the number of cells supplying the lamp-circuit, with consequent economy in battery-force and with proper gradation of light, are obvious. Fig. 4 shows a modification of devices shown in Fig. 3 for reducing the force charging the circuit $h\ h'$. Between the battery A A A and switch D is a rheostat for varying the resistance offered the battery in a well-known way.

What I claim is—

1. In the equipment of a railway-car, the combination, with the lamp-circuit $h\ h'$, and a battery mounted upon said car and portable therewith, of the switch mechanism, substantially as described, connecting between said lamp-circuit and said battery by two or more branch wires, whereby parts of the battery may be used independent of other parts.

2. The lamps L L L, each controlled independent of the others, a battery beneath the floor of the car in a compartment, a heater in said compartment, and switch mechanism above the floor of the car for connecting said battery to make operative said lamps, substantially as described.

3. The combination, with the lamp-circuit $h\ h'$, of a battery or batteries in a dust-tight compartment beneath the floor of a car, a heater for said compartment, and switch mechanism above the floor of said car for connecting and disconnecting said battery or batteries to and from said lamp-circuit, substantially as described.

4. In the equipment of a railway-car, the combination of a generator of electricity mounted on said car and portable therewith, a lamp-circuit, including switch mechanism, for controlling each lamp separately, and a rheostat and connections, or its described equivalent, for introducing the whole or any portion of the power of said generator into said lamp-circuit, whereby the light in said car can be reduced from its maximum by reducing the number of lamps lighted or by reducing the supply of electricity to the said lamp-circuit.

5. The compartment C, placed beneath the body of a car and containing a battery, and provided with a heating apparatus, substantially as described.

6. The combination, with a railway-car, of a dust-tight compartment for containing a battery that is supported in whole or in part by the truss-rods employed to strengthen the car, and a heater for warming the interior of said compartment.

7. The combination, with a railway-car, of a battery-compartment attached to the exterior of said car, and provided with an inner lining, and an intermediate space between the outside and inner walls or lining of said compartment filled with a material that is a poor conductor of heat.

8. The combination, with a railway-car, of a dust-tight compartment beneath said car, and provided with a door or closed opening at the side of the car, and a conduit between said compartment and the lamps in said car, substantially as described.

9. The combination, with a railway-car that is provided with a lamp-circuit, of a battery for charging said lamp-circuit that is removably placed on said car, and an auxiliary battery and switch devices on said car for connecting said auxiliary battery into said lamp-circuit, or to recharge said first-named battery, substantially as described.

10. The combination, with a railway-car, of a battery in a dust-tight compartment beneath said car, said compartment being provided with a door that drops or swings down, a circuit connecting said battery and lamps in said car, and switch mechanism between said battery and lamps for controlling each of said lamps and for introducing said battery into and withdrawing said battery from said lamp-circuit, the whole arranged and operating substantially as described.

11. In the equipment of a railway-car, the combination of the following-named elements: a lamp-circuit having lamps included therein that are provided with switch mechanism for controlling each lamp independent of the others, and with connections for connecting said lamp-circuit electrically to the lamp-circuit of another car, a battery removably attached to said car and included in said lamp-circuit, and provided with connections through switch mechanism to the outside connections, $w\ w'$.

12. The combination, with a railway-car, of a battery mounted thereon, an electrical generator on said car, and a switch having connections to said battery and said generator, and to a lamp-circuit and to connections on the exterior of the car, whereby said generator may be switched to charge said battery and said lamp-circuit separately or simultaneously, and whereby said generator may be disconnected from said battery and from said lamp-circuit and said battery be connected to said lamp-circuit.

CHARLES E. BUELL.

Witnesses:
A. C. BUELL,
JOSEPH W. BUELL.